United States Patent [19]
Sugimoto et al.

[11] Patent Number: 5,453,826
[45] Date of Patent: Sep. 26, 1995

[54] OPTICAL TIME DOMAIN REFLECTOMETER EMPLOYING SYNCHRONIZING SIGNALS TO SYNCHRONIZE THE SAMPLING AND MANIPULATION OF DATA REPRESENTING FIBERS OPTIC CHARACTERISTICS

[75] Inventors: Takashi Sugimoto; Takashi Sakamoto; Satoshi Makita, all of Kanagawa, Japan

[73] Assignee: Anritsu Corporation, Tokyo, Japan

[21] Appl. No.: 126,566

[22] Filed: Sep. 27, 1993

[30] Foreign Application Priority Data

Sep. 29, 1992 [JP] Japan ................................. 4-260022
Aug. 20, 1993 [JP] Japan ................................. 5-206654

[51] Int. Cl.$^6$ ............................................. G01N 21/88
[52] U.S. Cl. ................................................ 356/73.1
[58] Field of Search ................................... 356/73.1

[56] References Cited

FOREIGN PATENT DOCUMENTS 2092743 8/1982 United Kingdom ............... 356/73.1

OTHER PUBLICATIONS

M. Nakahira, "Optical Time Domain Reflectometer for Backscattered Light," Electronics and Communications in Japan, vol. 65, May 1982, pp. 39–47.

Patents Abstracts of Japan, P-877, May 26, 1989, vol. 13, No. 228, 1-38623, "Light Pulse Tester".

M. Nakazawa et al., "Photon Probe Fault Locator for Single–Mode Optical Fiber Using an Acoustoopical Light Deflector," IEEE Journal of Quantum Electronics, vol. QE–17, No. 7, Jul. 1981, pp. 1264–1269.

*Primary Examiner*—Vincent P. McGraw
*Attorney, Agent, or Firm*—Sughrue, Mion, Zinn, Macpeak & Seas

[57] ABSTRACT

In an optical time domain reflectometer, an optical pulse output unit supplies optical pulses intermittently to an optical fiber to be measured in accordance with the input timing of a cyclic signal. In response to the intermittent supply of the optical pulses, a reflected light data sampling unit samples the signal obtained from the optical fiber while the optical pulses are being supplied, while a noise data sampling unit samples the signal obtained from the optical fiber when the optical pulses are not supplied. Each of two or more groups of reflected light data and noise data obtained by the above sampling operations is averaged. After the averaging operations, an waveform data operating unit subtracts the noise data from the reflected light data in the common mode components corresponding to each other in terms of time, and then transforms the resultant data logarithmically to thereby operate the waveform data thereof.

11 Claims, 9 Drawing Sheets

FIG. 5(a) REFERENCE SIGNAL

FIG. 5(b) PULSE SUPPLY SWITCHING CONTROL SIGNAL

FIG. 5(c) OPTICAL PULSE

FIG. 5(d) SAMPLING CONTROL SIGNAL

FIG. 8 PRIOR ART

FIG. 9(a) PRIOR ART
OPTICAL PULSE

FIG. 9(b) PRIOR ART
REFLECTED LIGHT FROM OPTICAL FIBER TO BE MEASURED

OPTICAL TIME DOMAIN REFLECTOMETER EMPLOYING SYNCHRONIZING SIGNALS TO SYNCHRONIZE THE SAMPLING AND MANIPULATION OF DATA REPRESENTING FIBERS OPTIC CHARACTERISTICS

BACKGROUND OF THE INVENTION

1. Field of the Invention

The present invention relates to an optical time domain reflectometer which supplies optical pulses to an optical fiber to be measured, photoelectrically converts a backscattered light and a Fresnel reflected light which are returned back from the optical fiber to be measured when the optical pulses are supplied to the optical fiber, and processes the photoelectrically converted signals, thereby measuring the loss, fault and the like of the optical fiber.

2. Description of the Related Art

As a device which supplies optical pulses to an optical fiber to be measured, photoelectrically converts a backscattered light and a Fresnel reflected light as a result of the supply of the optical pulses, and processes the photoelectrically converted signals to display the waveform thereof, thereby measuring the loss, fault and the like of the optical fiber, there is known an optical time domain reflectometer.

Figure 8:
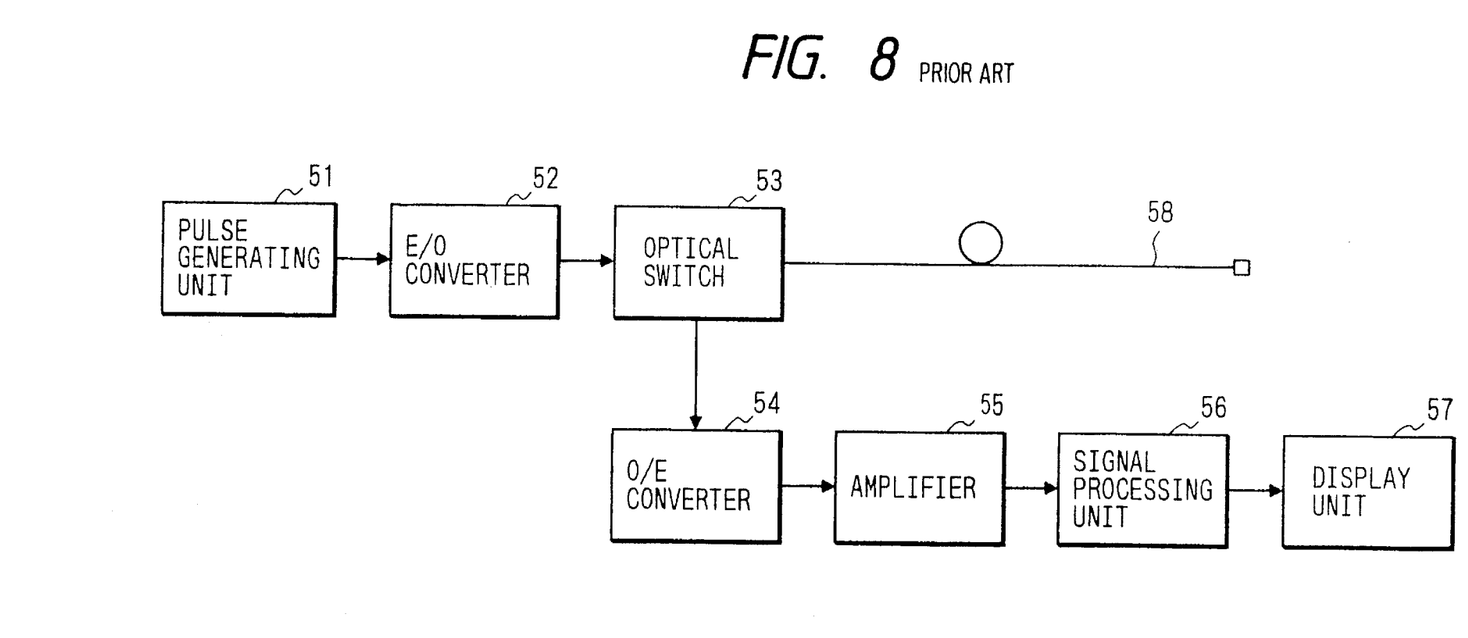
FIG. 8 is a block diagram showing a conventional optical time domain reflectometer.

FIG. 8 is a block diagram showing the structure of a conventional optical time domain reflectometer of this type.

The optical time domain reflectometer includes an optical pulse generating unit 51, an E/O converter 52, an optical switch 53 having a directional coupler, an O/E converter 54, an amplifier 55, a signal processing unit 56, and a display unit 57. In the optical time domain reflectometer, if a signal is output from the optical pulse generating unit 51 to the E/O converter 52 at a cycle corresponding to the length of an optical fiber 58 to be measured, (i.e. a cycle T longer than a time t from the supply of an optical pulse to the optical fiber 58 to the return of a reflected light from the entire length of the optical fiber 58), then the E/O converter 52 supplies an optical pulse every cycle T to the optical fiber 58 through the optical switch 53. A backscattered light and a Fresnel reflected light respectively that are returned from the optical fiber as a result of the supply of the optical pulses are supplied to the O/E converter 54 through the optical switch 53, and converted from light to electric signal by the O/E converter 54. The electric signal is processed by the signal processing unit 56. The signal processing unit 56 samples and transfers the electric signal logarithmically. Finally, in accordance with the result of the signal processing, the waveform thereof is displayed on the display unit 57.

Figure 9A:
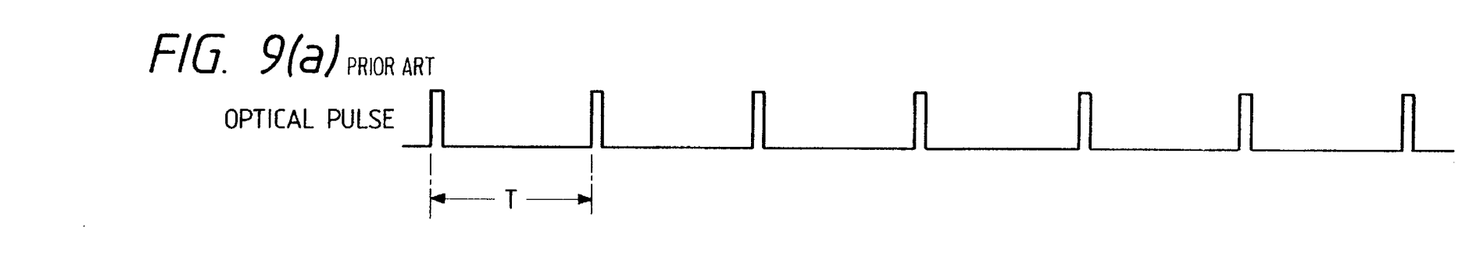
Figure 9B:
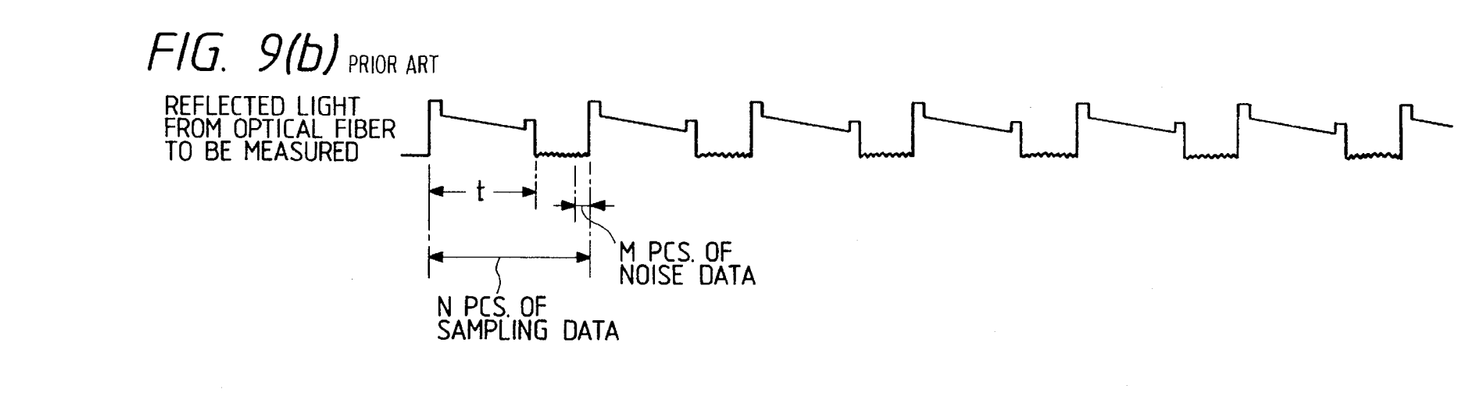

Referring further to the above-mentioned conventional optical time domain reflectometer, as shown in FIGS. 9 (a) and 9 (b), an optical pulse is supplied every cycle T (for example, 1 msec.) to the optical fiber 58. Further, the average value of M pcs. (for example, 20 pcs.) of data excluding the reflected lights from the optical fiber 58, in which M pcs. of data is part of N pcs. (for example, 5000) of data sampled during one cycle T, is expressed as zero data. The zero data is subtracted from each of N pcs. of data sampled and the resultant is then transformed logarithmically to thereby obtain waveform data thereof. The waveform is displayed in accordance with the obtained waveform data. For example, if the one cycle T sampling operation is repeatedly performed 256 times, the S/N is improved by means of the accumulative averaging processing.

Incidentally, a noise, which could occur within an optical time domain reflectometer of this type includes a noise such as the noise of an amplifier, the thermal noise and the like which occurs randomly in terms of time, and a cyclic noise such as the sampling clock noise. The signal in synchronization with the cycle of an optical pulse and the like which occurs at a given cycle while the level thereof is variable. In the optical time domain reflectometer having the above-mentioned structure, since a target signal component is extracted out of a waveform signal produced on the basis of a reflected light from an optical fiber to be measured, it is necessary to reduce the noise component thereof.

However, since the conventional optical time domain reflectometer is structured such that an optical pulse is repeatedly supplied at a cycle, and the zero data is subtracted from each of the sampling data to thereby obtain the time average of each of the sampling data, it is possible to reduce a noise component occurring randomly but impossible to reduce the common mode component of a cyclic noise.

SUMMARY OF THE INVENTION

The present invention aims at eliminating the above problems found in the conventional optical time domain reflectometer. Accordingly, it is an object of the invention to provide an optical time domain reflectometer capable of reducing surely a cyclic noise occurring at a given cycle within the reflectometer.

In attaining the above object, the invention provides an optical time domain reflectometer including optical pulse output means for supplying optical pulses intermittently to an optical fiber to be measured, first sampling means for sampling lights from the optical fiber while the optical pulses are being supplied to the optical fiber, second sampling means for sampling lights from the optical fiber when the optical pulses are not supplied to the optical fiber, and waveform data operating means for subtracting sampling data obtained by the second sampling means from sampling data obtained by the first sampling means, with the sampling data corresponding to each other in terms of time, to thereby operate waveform data thereof.

Also, the invention provides an optical time domain reflectometer including optical pulse control means for generating optical pulses in synchronization with a reference signal and supplying the optical pulses selectively to a transmission terminal of an optical fiber to be measured, an optical/electrical converter for converting lights from the transmission terminal of the optical fiber into an electric signal, sampling means for sampling the electric signal from the optical/electrical converter sequentially in synchronization with the reference signal for a given period of time just after the optical pulse control means supplies the optical pulses and storing the sampled values, and for sampling sequentially the electric signal from the optical/electrical converter when the optical pulse control means is not supplying the optical pulses in synchronization with the reference signal and storing the sampled values for the given period of time, and operating means for receiving the sampled values stored while the optical pulses are being supplied and the sampled values stored when the optical pulses are not supplied and performing a subtraction operation on each pair of sampled values corresponding to each other in sequence.

BRIEF DESCRIPTION OF THE DRAWINGS

FIGS. 2 (a) and 2 (b) are timing charts for explaining the operation of the first embodiment;

FIGS. 5 (a) through 5 (d) are timing charts for explaining a pulse supply switching operation to be performed by the second embodiment;

FIGS. 6 (a) and 6 (b) are timing charts for explaining sampling operations to be performed when the supply of the optical pulses are executed and stopped alternately two or more times in the second embodiment;

FIGS. 7 (a) and 7 (b) are timing charts for explaining sampling operations to be performed when the supply of the optical pulses are executed and stopped alternately once;

FIGS. 9 (a) and 9 (b) are timing charts for explaining the operation of the conventional optical time domain reflectometer.

DESCRIPTION OF THE PREFERRED EMBODIMENTS

Figure 1:
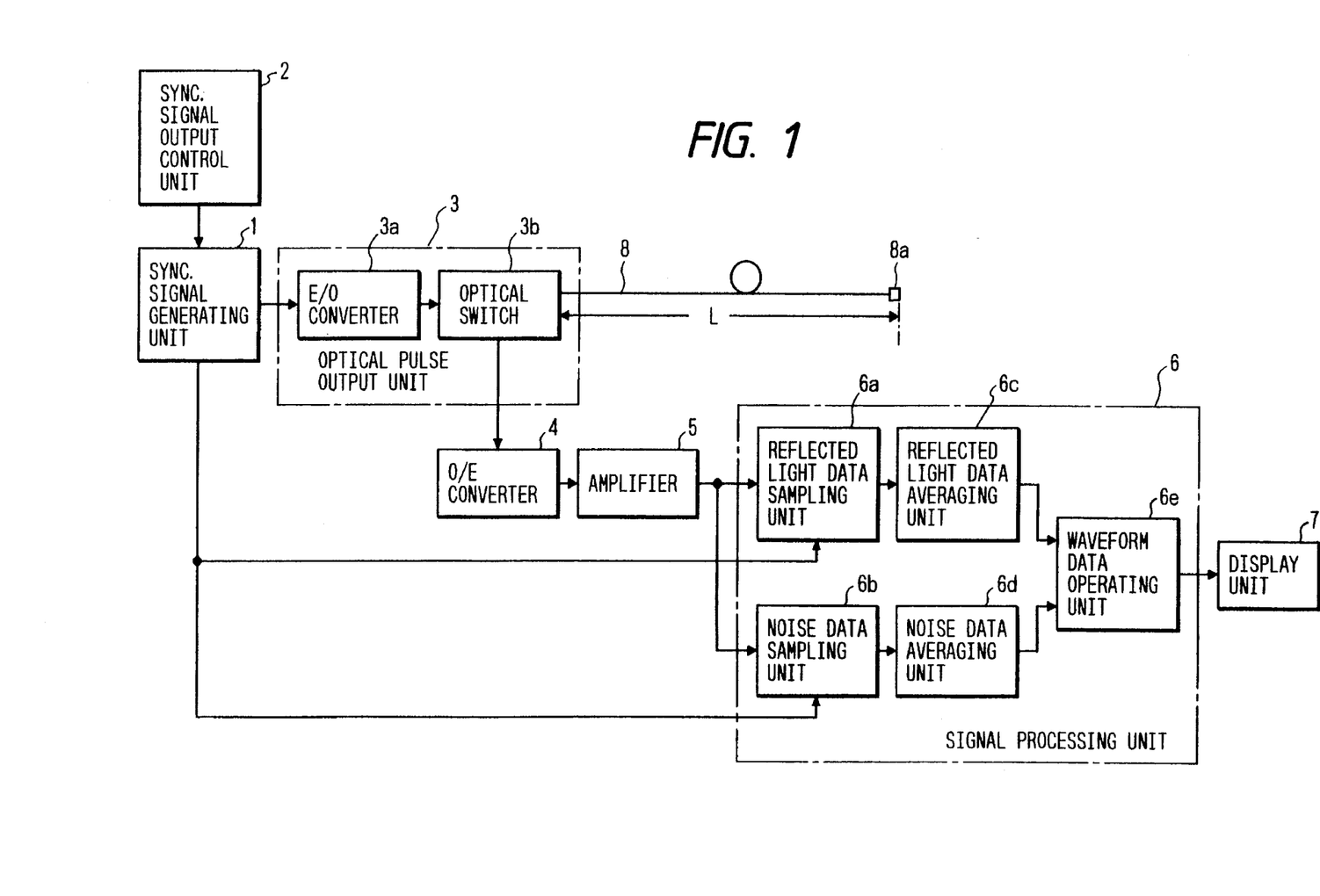
FIG. 1 is a block diagram showing a first embodiment of an optical time domain reflectometer according to the invention.
Figure 2A:
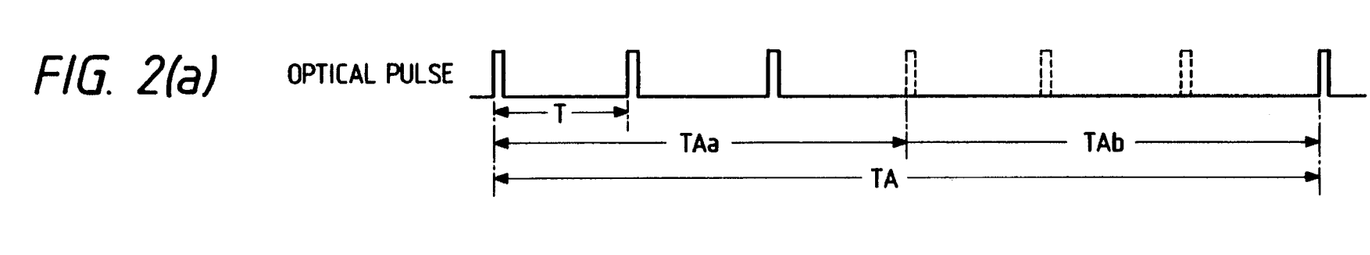
Figure 2B:
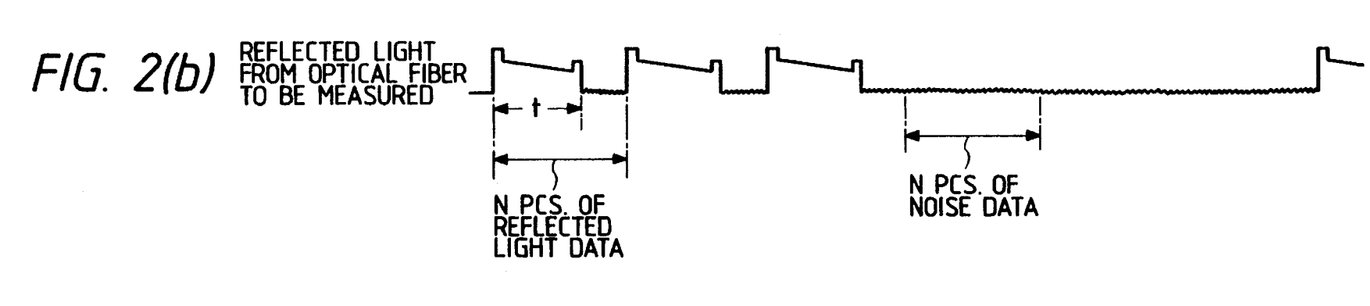

FIG. 1 is a block diagram showing a first embodiment of an optical time domain reflectometer according to the invention, and FIGS. 2 (a) and 2 (b) are timing charts for explaining the operation of the present optical time domain reflectometer.

The optical time domain reflectometer according to the first embodiment includes a synchronizing signal generating unit 1, a synchronizing signal output control unit 2, an optical pulse output unit 3, an O/E (optical/electrical) converter 4, an amplifier 5, a signal processing unit 6, and a display unit 7.

The synchronizing signal generating unit 1 outputs to the optical pulse output unit 3 and signal processing unit 6 a synchronizing signal having as one cycle a time period T (for example, 1 msec.). The cycle corresponds to the length L of the optical fiber 8 to be measured and is at least longer than a time period t which is the time from the supply of the optical pulse to the optical fiber 8 to the return of the reflected lights from the entire length of the optical fiber 8 (see FIGS. 2 (a) and 2 (b)).

The synchronizing signal output control unit 2 controls the input timing of a synchronizing signal to the optical pulse output unit 3 and signal processing unit 6. Furthermore, in the first embodiment, the control unit 2 controls the input timing of the synchronizing signal in such a manner that a synchronizing signal is input every cycle T to the signal processing unit 6. On the other hand, a synchronizing signal is input to an E/O converter 3a of the optical pulse output unit 3 (which will be described later) only during the first three cycles TAa of a repetitive cycle TA which completes six cycles and the input of the synchronizing signal is stopped during the latter three cycles TAb of the repetitive cycle TA.

Figure 3:
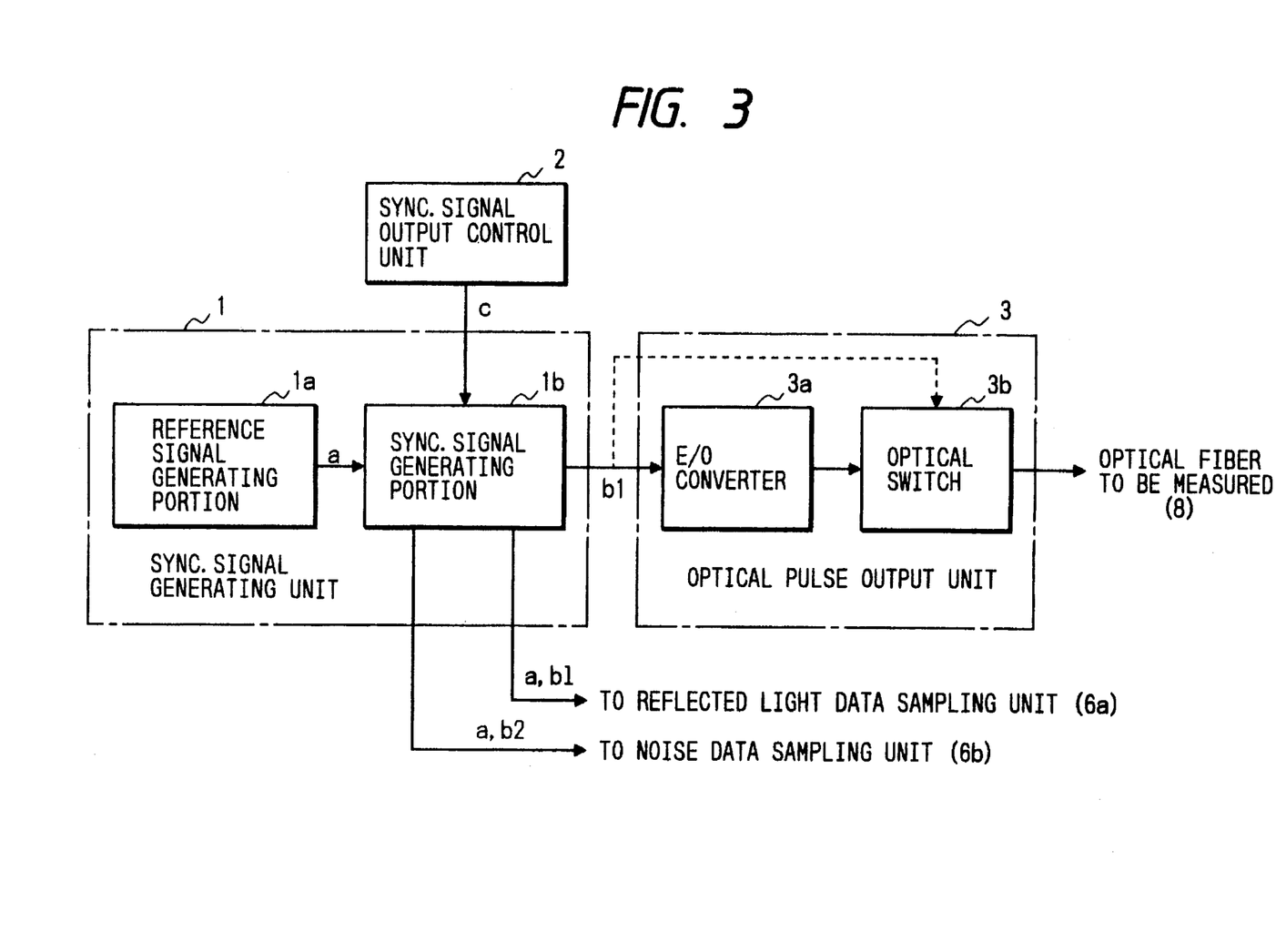
FIG. 3 is a block diagram for explaining the constitution of a synchronizing signal generating unit and a synchronizing signal output control unit employed in the first embodiment.

Furthermore the structures of the synchronizing signal generating unit 1 and synchronizing signal output control unit 2 with reference to FIG. 3 will be described below.

The synchronizing signal generating unit 1 includes a reference signal generating portion 1a and a synchronizing signal generating portion 1b. The reference signal generation portion 1a generates, as a reference signal a, a clock signal of a small pulse duration corresponding to a clock.

The synchronizing signal generating portion 1b generates, as a synchronizing signal, only the desired clock pulses of the reference signal a in accordance with a control signal c from the synchronizing signal output control unit 2. The synchronizing signal generating the portion 1b generates two kinds of synchronizing signals b1 and b2 according to the presence or absence of supply of the optical pulses to the optical fiber 8.

The synchronizing signal generating portion 1b outputs one synchronizing signal b1 together with the reference signal a to a reflected light data sampling unit 6a, and outputs the other synchronizing signal b2 together with the reference signal a to a noise data sampling unit 6b.

The optical pulse output unit 3 includes an E/O (electrical/optical) converter 3a and an optical switch 3b. The E/O converter 3a supplies optical pulses intermittently to the optical switch 3b in accordance with the synchronizing signal b1 input from the synchronizing signal generating unit 1 which is in turn controlled by the synchronizing signal output control unit 2.

The optical switch 3b supplies optical pulses, which are supplied intermittently from the E/O converter 3a, to the optical fiber 8.

The O/E converter 4 converts the backscattered light and Fresnel reflected light from the optical fiber 8, which are applied thereto through the optical switch 3b as a result of supply of the optical pulses, to an electric signal and outputs the electric signal to the amplifier 5.

The amplifier 5 amplifies the electric signal converted by the O/E converter 4 up to a given level and then outputs the amplified electric signal to the signal processing unit 6.

The signal processing unit 6, in accordance with a synchronizing signal from the synchronizing signal generating unit 1, processes the amplified electric signal to calculate the waveform data The signal processing unit 6 includes a reflected light data sampling unit 6a, a noise data sampling unit 6b, a reflected light data averaging unit 6c, a noise data averaging unit 6d, and a waveform data operating unit 6e.

The reflected light data sampling unit 6a, in accordance the timing of the former three cycles TAa of the repetitive cycle TA input from the synchronizing signal generating unit 1, sequentially samples the electric signal from the amplifier 5. The electric signal is sampled at a sampling cycle set at given and equal time intervals while the optical pulses are being supplied to the optical fiber 8. The reflected light data coupling unit 6a outputs the sampled, reflected data to the reflected light data averaging unit 6c in such a manner that N pcs. (for example, 5000 pcs.) of reflected data sequentially obtained by the sampling operation are treated as one group of data.

The noise data sampling unit 6b, in accordance with the timing of the latter three cycles TAb of the repetitive cycle TA input from the synchronizing signal generating unit 1, sequentially samples the electric signal from the amplifier 5. The electric signal is sampled at a sampling cycle set at given and equal time intervals while the optical pulses are not being supplied to the optical fiber 8. The noise data sampling unit 6b outputs the sampled noise data to the noise data averaging unit 6d in such a manner that N pcs. of noise data sequentially obtained by the sampling operation are treated as one group of data.

The reflected light data averaging unit 6c treats N pcs. of reflected light data sequentially input thereto from the reflected light data sampling unit 6a as one group of reflected data, takes two or more groups of reflected light data (in the first embodiment, three groups), operates the average thereof, and outputs the thus averaged N pcs. of reflected light data to the waveform data operating unit 6e.

The noise data averaging unit 6d treats N pcs. of noise data sequentially input thereto from the noise data sampling unit 6b as one group of noise data, takes two or more groups of noise data (in the first embodiment, three groups), operates the average thereof, and outputs the thus averaged N pcs. of noise data to the waveform data operating unit 6e.

The waveform data operating unit 6e compares N pcs. of reflected light data from the reflected light data averaging unit 6c with N pcs. of noise data from the noise data averaging unit 6d, subtracts the noise data from the reflected light data at the respective points (which correspond to the sampling positions) of the common mode components corresponding to each other in terms of time, and logarithmically transforms the data to determine the waveform data.

The display unit 7 displays on a display screen the waveform that represents the waveform data provided by the waveform data operating unit 6e.

Next, description will be given below of the operation of the optical time domain reflectometer having the above-mentioned structure.

To the signal processing unit 6 and optical pulse output unit 3 synchronizing signals are input every cycle T from the synchronizing signal generating unit 1. For the E/O converter 3a, the input of the synchronizing signals is controlled by the synchronizing signal output control unit 2 at such a repetitive cycle TA that the synchronizing signal is input during the first three cycles TAa of TA of every cycle T and the input of the synchronizing signal is stopped during the last three cycles TAb of TA of every cycle T. As a result of this, during the former three cycles TAa of the repetitive cycle (i.e. 6 cycles of the synchronizing signal), the optical pulses are supplied every cycle T to the optical fiber 8, whereas during the latter three cycles TAb the supply of the optical pulses to the optical fiber 8 is stopped (see FIGS. 2 (a) and 2 (b)). Similarly, the optical pulses are supplied intermittently at the repetitive cycle TA to the optical fiber 8 in the above-mentioned manner.

In the former three cycles TAa during which the optical pulses are supplied to the optical fiber 8, the optical pulses reflected lights from the optical fiber 8 caused by the optical pulses converted into electric signal by the O/E converter 4 and amplified to a given level by the amplifier 5. Then the electric signal is input to the reflected light data sampling unit 6a. The reflected light data sampling unit 6a samples sequentially the electric signal from the amplifier 5 every cycle T of the synchronizing signal, and outputs three groups of reflected light data to the reflected light data averaging unit 6c. (Each group consists of N pcs. of reflected light data). The reflected light data averaging unit 6c averages the three groups of reflected light data, and then outputs the averaged N pcs. of reflected light data to the waveform data operating unit 6e.

On the other hand, in the latter three cycles TAb during which the optical pulses are not supplied to the optical fiber 8, the noise data sampling unit 6b samples sequentially the electric signal from the amplifier 5 at an input timing to be set every cycle T of the synchronizing signal. The noise data sampling unit 6b outputs three groups of noise data. (Each group consists of N pcs of noise data) to the noise data averaging unit 6d Then, the noise data averaging unit 6d averages the three groups of noise data, and outputs the averaged N pcs. of noise data to the waveform data operating unit 6e.

Next, the waveform data operating unit 6e subtracts the noise data from the reflected light data at the respective points of the common mode components corresponding to each other in terms of time. Then the waveform data operating unit 6c logarithmically transforms the obtained data to N pcs. of waveform data. Finally, the N pcs. of waveform data are displayed on the display screen of the display unit 7 as a waveform.

Therefore, in the above-mentioned embodiment, since the noise data is subtracted from the reflected light data in the common mode components corresponding to each other in terms of time, the noise components occurring at the same timing in each cycle T are canceled to reduce the cyclic noise. Therefore, it is possible to achieve measurement with reduced noise influence and with higher accuracy.

Also, the optical pulses are supplied intermittently to the optical fiber 8 in accordance with the input timing of the synchronizing signal. Thus a plurality of groups of reflected light data are obtained by the data sampling operation while the optical pulses are being supplied to the optical fiber 8, and a plurality of groups of noise data obtained by the data sampling operation when the optical pulses are not supplied to the optical fiber 8. Consequently, when these groups of data are respectively averaged in terms of time, even the noise occurring randomly within the reflectometer can be also reduced as usual.

The noise occurring randomly within the reflectometer can be further reduced by increasing the total number of samplings as in a conventional manner.

Figure 4:
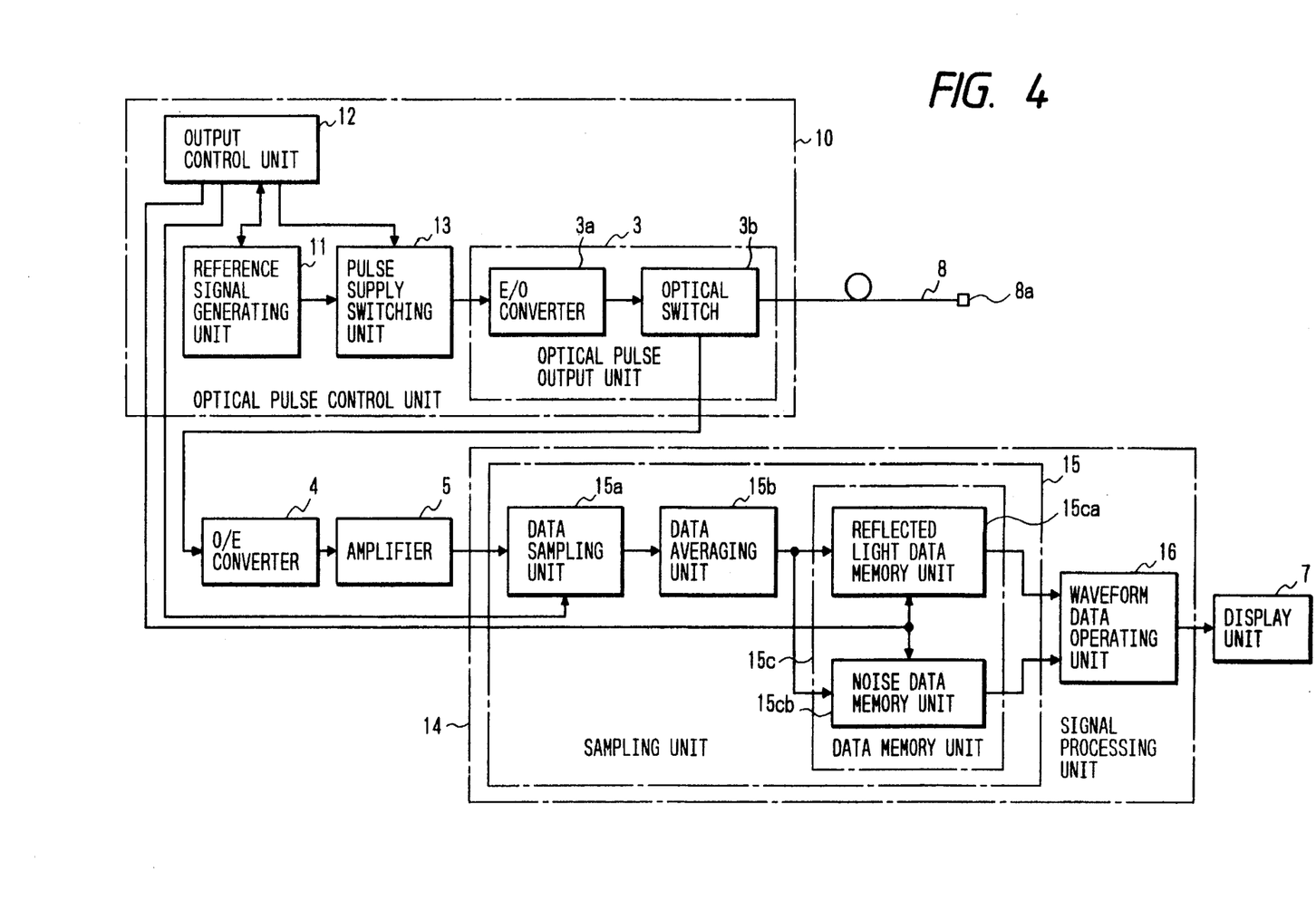
FIG. 4 is a block diagram showing a second embodiment of the optical time domain reflectometer according to the invention.
Figures 5A, 5B:
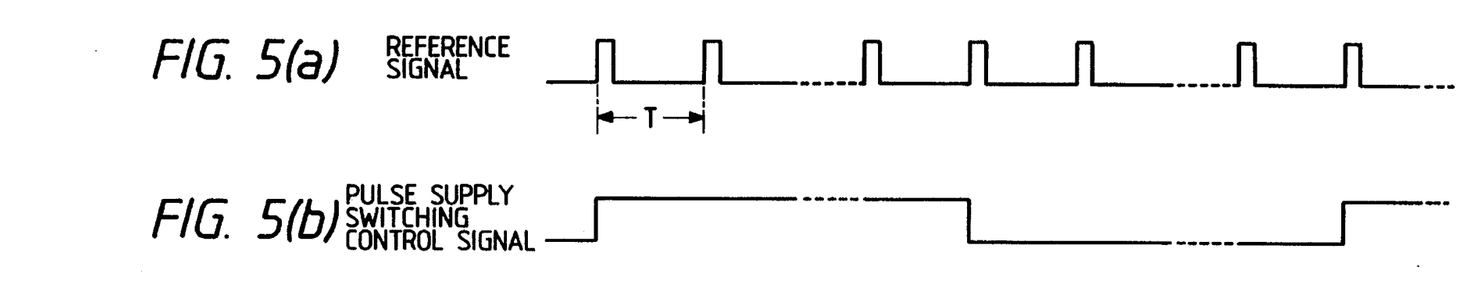
Figure 5C:
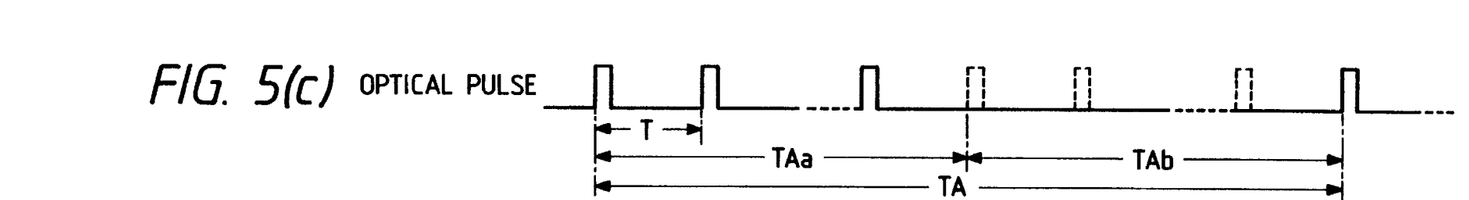
Figure 5D:
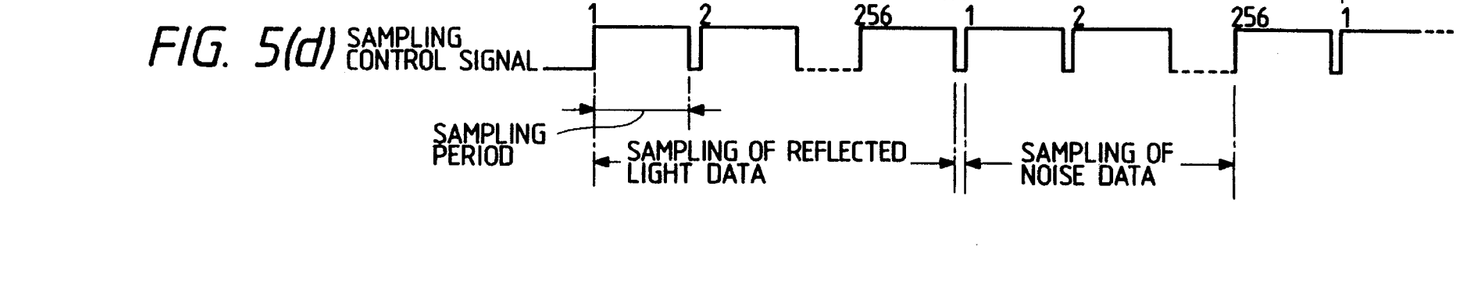
Figure 6A:
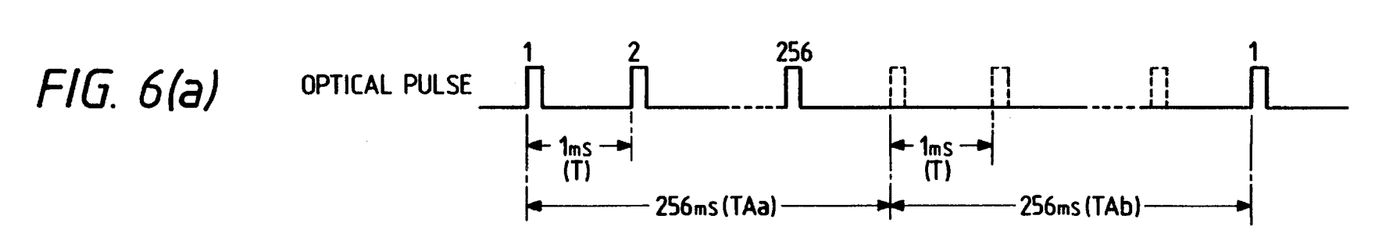
Figure 6B:
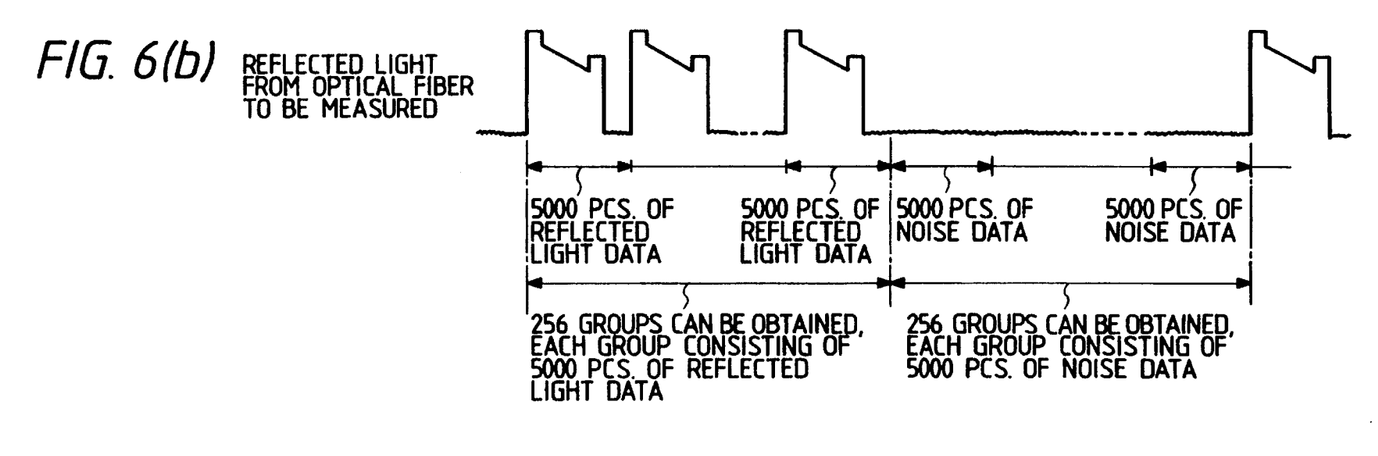

Next, FIG. 4 is a block diagram showing a second embodiment of the optical time domain reflectometer according to the invention, FIGS. 5 (a) through 5 (d) are timing charts showing a pulse supply switching operation to be performed by the present optical time domain reflectometer, and FIGS. 6 (a) and 6 (b) are timing charts showing a sampling operation to be performed by the present optical time domain reflectometer.

In the second embodiment, the optical time domain reflectometer includes an optical pulse control unit 10, an O/E converter 4, an amplifier 5, a signal processing unit 14, and a display unit 7. The same elements as in the above-mentioned first embodiment are given the same designations when they are described.

The optical pulse control unit 10 includes a reference signal generating unit 11, an output control unit 12, a pulse supply switching unit 13, and an optical pulse output unit 3.

The reference signal generating unit 11 outputs, as a reference signal, a clock signal having a given pulse duration at a cycle T of an equal time interval to the pulse supply switching unit 13 as shown in FIG. 5 (a).

The output control unit 12 controls the output timing of the reference signal to be generated by the reference signal generating unit 11. Also, the unit 12 outputs a pulse supply switching control signal which is used to switch the supply of the optical pulse to the optical fiber 8. Referring further to the output control unit 12, as shown in FIG. 5 (b), it outputs the pulse supply switching control signal, which turns on/off each time (every 256 msec.) when n (256) pcs. of reference signals are input from the reference signal generating unit 11, to the pulse supply switching unit 13. Moreover, the output control unit 12 outputs a sampling control signal shown in FIG. 5 (d) to a data sampling unit 15a which will be described later. In addition, the output control unit 12 outputs a select control signal to decide that the sampled data are to be stored in a reflected light data memory unit 15ca or in a noise data memory unit 15cb both of which will be described later.

The pulse supply switching unit 13 outputs an optical pulse control signal for generating optical pulses shown in FIG. 5 (c) to the optical pulse output unit 3 in accordance with the timing of the pulse supply switching control signal supplied from the output control unit 12. In particular, the pulse supply switching unit 13 turns on the optical pulse control signal in accordance with the timing of the reference signal while the pulse supply switching control signal from the output control unit 12 is on, and turns off the output of the optical control signal while the pulse supply switching control signal is off.

The optical pulse output unit 3 includes an E/O converter 3a and an optical switch 3b. The E/O converter 3a supplies optical pulses shown in FIG. 5 (c) to the optical fiber 8 in accordance with the on/off timing of the optical pulse control signal from the pulse supply switching unit 13. In more detail, the E/O converter 3a supplies the optical pulses to the optical switch 3b every 256 cycles TAa in the former half section of the repetitive cycle TA while the optical pulse control signal is on. Also, the E/O converter 3a stops the supply of the optical pulses to the optical switch 3b every 256 cycles TAb in the latter half section while the optical pulse control signal is off, and supplies the optical pulses intermittently to the optical switch 3b.

The optical switch 3b supplies the optical fiber 8 with the optical pulses that are intermittently provided by the E/O converter 3a.

The O/E converter 4 converts a backscattered light and a Fresnel reflected light from the optical fiber 8, which are respectively supplied thereto through the optical switch 3b as a result of the supply of the optical pulses, into an electric signal and then outputs the electric signal to the amplifier 5.

The amplifier 5 amplifies the electric signal, which is converted by the O/E converter 4, up to a given level and then outputs it to the signal processing unit 14.

The signal processing unit 14 signal processes the reflected lights from the optical fiber 8 to thereby calculate the waveform data thereof. The signal processing unit 14 includes a sampling unit 15 and a waveform data operating unit 16.

The sampling unit 15 includes a data sampling unit 15a, a data averaging unit 15b and a data memory unit 15c.

The data sampling unit 15a samples sequentially the electric signal from the amplifier 5 at a given sampling cycle in accordance with the timing of a sampling control signal shown in FIG. 5 (d). In more detail, while the optical pulses are being supplied to the optical fiber 8, the data sampling unit 15a outputs to the data averaging unit 15b the sample values that are sequentially obtained by sampling N pcs. (for example, 5000 pcs.) of reflected light data. On the other hand, when the optical pulses are not supplied to the optical fiber 8, the data sampling unit 15a outputs to the data averaging unit 15b the sample values that are obtained sequentially by sampling. Then the data averaging unit 15b N pcs. (for example, 5000 pcs.) of noise data.

The data averaging unit 15b, with N pcs. of data sequentially input thereto from the data sampling unit 15a as one group data (or data group), takes in a plurality (n pcs.) of such data group (in the present embodiment, n=256 groups) and performs averaging operations on them outputs the averaged N pcs. of data to the data memory unit 15c. If N pcs. of reflected light data is input from the data sampling unit 15a, then the data averaging unit 15b, with N pcs. of reflected light data as one group data, inputs 256 groups, performs averaging operations on them, and then outputs the averaged N pcs. of reflected light data to the data memory unit 15c. On the other hand, if N pcs. of noise data are input therein from the data sampling unit 15a, then the data averaging unit 15b, with N pcs. of noise data as one data group, inputs 256 groups, performs averaging operations on them, and then outputs the averaged N pcs. of noise data to the data memory unit 15c.

The data memory unit 15c includes the reflected light data memory unit 15ca and noise data memory unit 15cb. Either the reflected light data memory unit 15ca or the noise data memory unit 15cb can be selected in accordance with the select control signal from the output control unit 12. For example, when the select control signal is of an H level (high level), the reflected light data memory unit 15ca stores N pcs. of reflected light data which have been average processed by the data averaging unit 15b. When the select control signal is of an L level (low level), the noise data memory unit 15cb stores N pcs. of noise data which have been average processed by the averaging unit 15b.

The waveform data operating unit 16 receives and compares N pcs. of reflected light data from the reflected light data memory unit 15ca and N pcs. of noise data from the noise data memory unit 15cb. Then the waveform data operating unit 16 subtracts the noise data from the reflected light data. In other words, the noise data is subtracted from the reflected light data at respective points (which correspond to the sampling positions) of the common mode components corresponding to each other in terms of time. Finally, the waveform data operating unit 16 transforms the data logarithmically to determine the waveform data thereof.

The display unit 7 displays on the display screen the waveform that represents the waveform data determined by the waveform data operating unit 16.

Next, description will be given below of the operation of the optical time domain reflectometer constructed in the above-mentioned manner.

The reference signal generating unit 11 generates a reference signal every cycle T in accordance with the control of the output control unit 12 (see FIG. 5 (a)). The output control unit 12 outputs a pulse supply switching control signal which turns on at the first rising of the reference signal and turns off at the 257-th rising of the reference signal (see FIG. 5 (b)). Responsive to this, the pulse supply switching unit 13, with 512 cycles as a repetitive cycle TA, supplies the optical pulses to the optical fiber 8 every cycle T in the former 256 cycles TAa of the repetitive cycle TA, and stops the supply of the optical pulses to the optical fiber 8 in the latter 256 cycles TAb (see FIG. 5 (c) and FIG. 6 (a)). At that time, the select control signal of the output control unit 12 is of an H level.

In the former 256 cycles TAa during which the optical pulses are being supplied to the optical fiber 8, the reflected lights from the optical fiber 8 are converted into electric signal by the O/E converter 4, are amplified to a given level by the amplifier 5, and are then input to the data sampling unit 15a. The data sampling unit 15a, in accordance with a sampling control signal shown in FIG. 5 (d), samples sequentially the electric signal from the amplifier 5. Then, the data sampling unit 15a outputs 256 groups of reflected light data to the data averaging unit 15b (see FIG. 6 (b)) N pcs. of reflected light data as one group of data. The data averaging unit 15b averages the 256 groups of reflected light data The averaged N pcs. of reflected light data are stored in the reflected light data memory unit 15ca.

Next, in the latter 256 cycles TAb during which the optical pulses are not supplied to the optical fiber to be measured 8, the select control signal of the output control unit 12 is of an L level. The data sampling unit 15a, in accordance with a sampling control signal shown in FIG. 5 (d), samples sequentially the electric signal from the amplifier 5. Then, the data sampling unit 15a outputs 256 groups of noise data to the data averaging unit 15b (see FIG. 6 (b)) (N pcs. of noise data comprise one group of data). The data averaging unit 15b averages the 256 groups of noise data The averaged N pcs. of noise data are then stored in the noise data memory unit 15cb.

Then, the waveform data operating unit 16 reads out the reflected light data and noise data in the respective points of the common mode components corresponding to each other in terms of time from the data memory unit 15c, and subtracts the read-out noise data from the read-out reflected light data. Then the waveform data operating unit 16 logarithmically transforms the resultant data to determine N pcs. of waveform data. Finally, the waveform that is produced in accordance with the calculated N pcs. of waveform data is displayed on the display screen of the display unit 7.

According to the above-mentioned second embodiment, since a subtraction operation is performed on every pair of the reflected light data and noise data which correspond in sequence to each other, (as in the first embodiment), the noise components occurring at the same time in each cycle T can be canceled to thereby reduce the cyclic noise. This which makes it possible to obtain a measurement with reduced noise influence and higher accuracy. Also, even the noise that occurs randomly within the reflectometer can be also reduced by the conventional averaging operation. Further, because both the random and cyclic noises can be reduced, even if the reflectometer is used in parallel in an optical communication line, the reflectometer can reduce noise and improve S/N sufficiently to thereby realize a highly accurate communication.

In the above-mentioned embodiment, a structure is described in which the synchronizing signal input to the E/O converter 3a is controls the intermittent supply of the optical pulses to be supplied to the optical fiber 8. However, this is not limitative a similar effect can be also provided by such a structure in which the synchronizing signal is input to the optical switch 3b instead of the E/O converter 3a as shown by a broken line in FIG. 3.

Figure 7A:
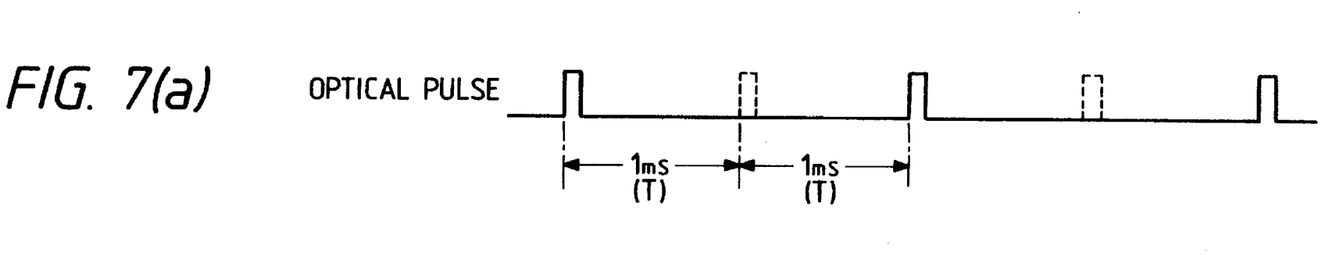
Figure 7B:
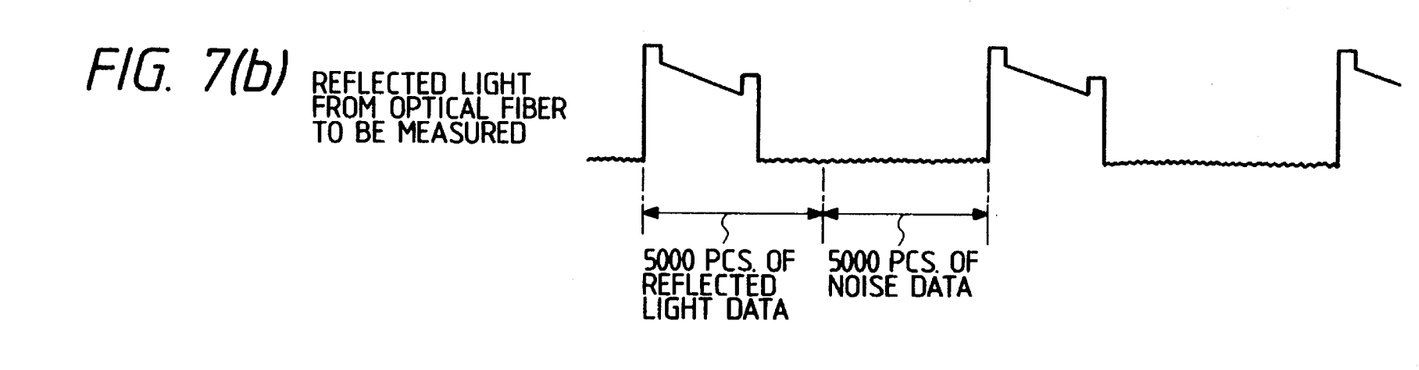

Also, in the above-mentioned embodiments, a structure is described in which the intermittent supply of the optical pulses to the optical fiber 8 is executed every three cycles (3T) and 256 cycles (256T). However, this is not limitative, and employed another structure in which the optical pulses are output at arbitrary cycles, for example, at every other cycle, that is, at alternate cycles, with one cycle (1T) set as 1 msec., as shown in FIGS. 7 (a) and 7 (b), or, at every third cycles.

Further, in the above-mentioned embodiments, when the optical time domain reflectometer is in operation, if light enters from the side of a terminal surface 8a of the optical fiber 8, then the level of a waveform signal is raised or shifted as a whole. The present reflectometer judges the shifted component as noise (unnecessary signal) and thus can signal process the level of the noise as 0 (reference level).

As has been described heretofore, in the optical time domain reflectometer according to the first aspect of the invention, the optical pulses are intermittently supplied to the optical fiber to be measured and the sampling data obtained when the optical pulses are not supplied are subtracted from the sampling data obtained while the optical pulses are being supplied, in the common mode components of the sampling data corresponding to each other in terms of time, to thereby provide the waveform data thereof. Also, in the optical time domain reflectometer according to the second aspect of the invention, the optical pulses synchronized with the reference signal are selectively supplied to the optical fiber to be measured, the sampled values obtained for a given period of time just after the supply of the optical pulses and the sampled values obtained when the optical pulses are not supplied are stored, and a subtraction operation is performed on each pair of sampled values obtained while the optical pulses are being supplied and when the optical pulses are not supplied corresponding to each other in sequence. Therefore, the present reflectometer is able to surely reduce noise, especially, the cyclic noise that may occur at a given cycle within the reflectometer.

What is claimed is:

1. An optical time domain reflectometer comprising:

synchronizing signal output control means for generating an output control signal;

synchronizing signal generating means comprising a reference signal generating portion for generating a reference signal and a synchronizing signal generating portion for generating a first synchronizing signal and a second synchronizing signal, wherein said first synchronization signal and said second synchronization signals are generated according to said reference signal and said output control signal;

optical pulse output means for supplying optical pulses intermittently to an optical fiber to be measured, wherein said optical pulses are supplied according to said first synchronization signal;

first sampling means for sampling signals from the optical fiber when the optical pulses are being supplied to the optical fiber, wherein said first sampling means samples said signals according to said first synchronization signal and said reference signal;

second sampling means for sampling signals from the optical fiber when the optical pulses are not being supplied to the optical fiber, wherein said second sampling means samples said signals according to said second synchronization signal and said reference signal; and waveform data operating means for generating waveform data by subtracting second sampling data obtained by said second sampling means from first sampling data obtained by said first sampling means that corresponds to said second sampling data in terms of time, wherein said first sampling data represents said signals sampled by said first sampling means and said second sampling data represents said signals sampled by said second sampling means.

2. The optical time domain reflectometer according to claim 1, wherein said optical pulse output means includes an electrical/optical converter for converting said first synchronizing signal supplied from said synchronizing signal generating means to said optical pulses.

3. The optical time domain reflectometer according to claim 1, further comprising an optical/electrical converter for converting the signals obtained from the optical fiber in response to the optical pulses into electric signals and for supplying the electric signals to said first sampling means and said second sampling means.

4. The optical time domain reflectometer according to claim 1, further comprising first averaging means for performing an averaging operation on a plurality of groups of sampling data obtained by said first sampling means and for supplying averaged data to said waveform data operating means, and second averaging means for performing an averaging operation on a plurality of groups of sampling data obtained by said second sampling means and for supplying averaged data to said waveform data operating means.

5. The optical time domain reflectometer according to claim 1, further comprising display means for displaying a waveform based on the waveform data obtained by said waveform data operating means.

6. An optical time domain reflectometer comprising:

optical pulse control means for generating optical pulses in synchronization with a reference signal and supplying the optical pulses selectively to a transmission terminal of an optical fiber to be measured;

an optical/electrical converter for converting optical signals from the transmission terminal of the optical fiber into electric signals;

sampling means for sequentially sampling the electric signals from said optical/electric converter in synchronization with the reference signal and sequentially storing sampled values representing the electrical signals in synchronization with a pulse switching control signal, wherein said sampled values are stored in a first memory location during a first period of time when said optical pulse control means is supplying the optical pulses to said transmission terminal and said sampled values are stored in a second memory location during a second period of time when said optical pulse control means is not supplying the optical pulses to said transmission terminal; and operating means for receiving the sampled values stored in said first memory location and the sampled values stored in said second memory location and subtracting each of the sampled values stored in said second memory location from said sampled values stored in said first memory location which correspond to each other in sequence.

7. The optical time domain reflectometer according to claim 6, wherein said optical pulse control means includes reference signal generating means for generating the reference signal, pulse supply switching means for outputting an optical pulse control signal according to the reference signal based on the timing of the pulse supply switching control signal, and an electrical/optical converter for supplying the optical pulses to the optical fiber in accordance with an on/off timing of the optical pulse control signal.

8. The optical time domain reflectometer according to claim 6, wherein said sampling means includes data averaging means for averaging the sampled values representing the electrical signals from said optical/electrical converter before the sampled values are stored.

9. The optical time domain reflectometer according to claim 6, further comprising display means for displaying data obtained by said operating means.

10. The optical time domain reflectometer according to claim 6, wherein said first memory location is located within a reflected light data memory means and said second memory location is located within a noise data memory means.

11. The optical time domain reflectometer according to claim 6, wherein said first memory location and said second memory location is located within a single memory means.

* * * * *